US012754129B2

(12) United States Patent
Aoki et al.

(10) Patent No.: US 12,754,129 B2
(45) Date of Patent: Oct. 6, 2026

(54) METHOD OF DIAGNOSING DETERIORATION OF RESIN PART

(71) Applicant: SUBARU CORPORATION, Tokyo (JP)

(72) Inventors: Hisashi Aoki, Tokyo (JP); Masanori Sasaki, Tokyo (JP); Yasuyoshi Sasaki, Tokyo (JP); Ryuhei Konose, Tokyo (JP); Koji Kawashita, Tokyo (JP); Naoki Eguchi, Tokyo (JP); Masami Shiki, Tokyo (JP); Sara Ishikawa, Tokyo (JP); Hirokuni Fujiwara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 358 days.

(21) Appl. No.: 18/680,902

(22) Filed: May 31, 2024

(65) Prior Publication Data

US 2024/0319070 A1 Sep. 26, 2024

Related U.S. Application Data

(63) Continuation of application No. PCT/JP2022/036712, filed on Sep. 30, 2022.

(51) Int. Cl.
*G01N 17/00* (2006.01)
*G06Q 10/20* (2023.01)

(52) U.S. Cl.
CPC ............ *G01N 17/00* (2013.01); *G06Q 10/20* (2013.01)

(58) Field of Classification Search
CPC ............................... G01N 17/00; G06Q 10/20
(Continued)

(56) References Cited

U.S. PATENT DOCUMENTS 6,343,634 B1 * 2/2002 Suzuki .................... B60C 19/08 152/DIG. 2
6,450,036 B1 * 9/2002 Ashida ................ G01N 29/043 73/598

(Continued)

FOREIGN PATENT DOCUMENTS

JP H11-132909 A 5/1999
JP 2016033507 A * 3/2016

(Continued)

OTHER PUBLICATIONS

Deterioration Diagnosis Method of Resin Pipeline System (Year: 2016).*

(Continued)

*Primary Examiner* — Zhen Y Wu
(74) *Attorney, Agent, or Firm* — Rimon P.C.

(57) ABSTRACT

A method of diagnosing a deterioration of a resin part includes: fabricating a deterioration detection part by adding a detection additional member to the resin part, in which the detection additional member is faster in progress of a deterioration than the resin part, and the adding the detection additional member includes bonding the detection additional member to a surface of the resin part or insert-molding the detection additional member to the resin part; incorporating the deterioration detection part into a portion, of a vehicle, where the resin part is to be incorporated; detecting, after an elapse of a predetermined period of time, a degree of the progress of the deterioration of the detection additional member; and estimating the degree of the progress of the deterioration of the resin part, based on data on a correlation between the deterioration of the detection additional member and the deterioration of the resin part.

6 Claims, 4 Drawing Sheets

(58) Field of Classification Search
USPC .......................................................... 702/34
See application file for complete search history.

(56) References Cited

U.S. PATENT DOCUMENTS

| | | | | |
|---|---|---|---|---|
| 10,604,147 | B2 * | 3/2020 | Dudar .............. | F02M 35/10386 |
| 11,055,671 | B1 * | 7/2021 | Rose .................. | G01N 33/0075 |
| 11,518,366 | B2 * | 12/2022 | Dudar ................. | G01M 15/106 |
| 2012/0158269 | A1 * | 6/2012 | Nakayama .............. | F01N 11/00 701/103 |
| 2017/0082526 | A1 * | 3/2017 | Kuroda .................... | G01N 3/20 |
| 2018/0357613 | A1 * | 12/2018 | Engelbart ........ | G06Q 10/06311 |
| 2019/0135270 | A1 * | 5/2019 | Dudar ..................... | F02D 41/22 |
| 2021/0319410 | A1 * | 10/2021 | Taniguchi ........ | G06Q 10/06312 |
| 2022/0186643 | A1 * | 6/2022 | Tsukagoshi ............. | F01N 3/023 |
| 2022/0207926 | A1 * | 6/2022 | Kobayashi ............. | G06Q 40/08 |
| 2024/0273268 | A1 * | 8/2024 | Kuroda ................. | G01M 13/00 |

FOREIGN PATENT DOCUMENTS

| | | | |
|---|---|---|---|
| JP | 2018-071986 | A | 5/2018 |
| JP | 2018-194382 | A | 12/2018 |
| JP | 2019-095291 | A | 6/2019 |
| JP | 2022-102818 | A | 7/2022 |
| WO | 2019021586 | A1 | 1/2019 |

OTHER PUBLICATIONS

International Search Report received in corresponding PCT Application No. PCT/JP2022/036712, dated Dec. 13, 2022.

* cited by examiner

METHOD OF DIAGNOSING DETERIORATION OF RESIN PART

CROSS REFERENCES TO RELATED APPLICATIONS

This application is continuation of International Application No. PCT/JP2022/036712, filed on Sep. 30, 2022, the entire contents of which are hereby incorporated by reference.

BACKGROUND

The disclosure relates to a method of diagnosing a deterioration of a resin part.

A vehicle such as an automobile is demanded to travel in various regions and environments. Accordingly, the vehicle is to have durability in order to address severe situations. These situations apply similarly to various parts incorporated in the vehicle as well. A vehicle part, especially a resin part, undergoes a deterioration due to a factor such as a heat or a moisture and a physical property of the resin part can change due to the deterioration, which can prevent the resin part from exerting its original capability. Accordingly, it has been desired that such a resin part has a specification that makes it possible to withstand an environmental load during a period from a production of the vehicle to a retirement of the vehicle such as 25 years.

An example method of estimating an environmental load that a resin part has received includes collecting the resin part from a vehicle used and performing methods including, for example, infrared spectroscopy and a chemical luminescence measurement. These methods make it possible to estimate a certain degree of environmental load and to estimate, for example, how much heat is added to the resin part. However, the measurement can involve a destruction of parts and a result is not always reliable, making it difficult to feedback thus-obtained data to a vehicle currently in use.

Japanese Unexamined Patent Application Publication (JP-A) No. H11-132909 discloses: providing a resin part to be used in an automobile with a protrusion adapted to detect a deterioration; detecting a progress of the deterioration from, for example, a displacement when a predetermined load is applied to the protrusion or a change in a natural frequency when a predetermined displacement is applied to the protrusion; and sensing a change in rigidity or a change in strength of the part resulting from the detection. Continuing such a measurement at predetermined intervals makes it possible to understand the progress of the deterioration and to, for example, prompt a replacement of the resin part upon periodic inspection.

SUMMARY

An aspect of the disclosure provides a method of diagnosing a deterioration of a resin part. The method estimates a degree of progress of the deterioration of the resin part incorporated in a vehicle. The method includes: fabricating a deterioration detection part by adding a detection additional member to the resin part, in which the detection additional member is faster in progress of a deterioration than the resin part and easier to detect the progress of the deterioration than the resin part, and in which the adding the detection additional member to the resin part includes bonding the detection additional member to a surface of the resin part or insert-molding the detection additional member to the resin part; incorporating the deterioration detection part into a portion, of the vehicle, where the resin part is to be incorporated; detecting, after an elapse of a predetermined period of time, a degree of the progress of the deterioration of the detection additional member added to the resin part; and estimating, based on correlation data obtained in advance, the degree of the progress of the deterioration of the resin part, in which the correlation data is data on a correlation between the deterioration of the detection additional member and the deterioration of the resin part.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
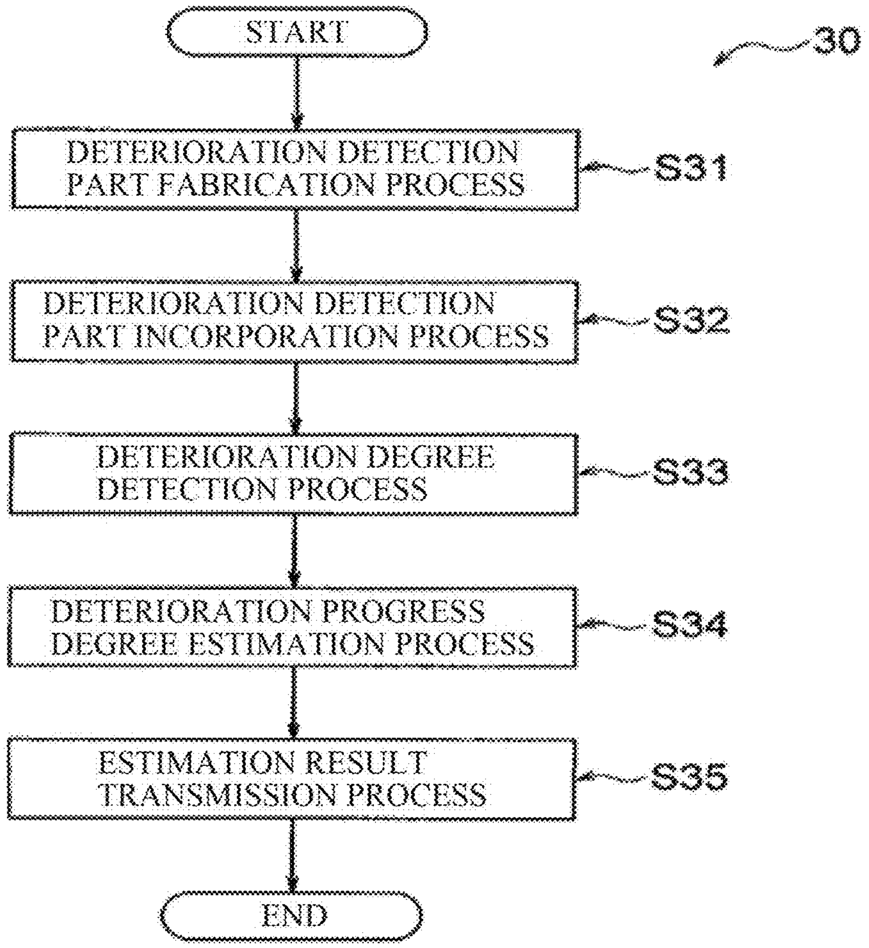
FIG. 1 is a flowchart illustrating a method of diagnosing a deterioration of a resin part according to one example embodiment of the disclosure.

A method disclosed in JP-A No. H11-132909 provides a deterioration detection protrusion on a resin part, and makes it possible to understand the degree of deterioration of the resin part by periodically detecting a change in mechanical characteristics. However, depending on a type of the resin part, it is difficult to accurately obtain the displacement described above and to detect a progress of the deterioration from the displacement as well, making it difficult to accurately understand the progress of the deterioration clearly.

It is desirable to provide a method of diagnosing a deterioration of a resin part that makes it possible to accurately understand the degree of progress of a deterioration of a resin part.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is a flowchart illustrating a method of diagnosing a deterioration of a resin part according to an example embodiment of the disclosure. Non-limiting examples of the resin part to be diagnosed by the method of diagnosing the deterioration of the resin part according to the example embodiment may include an intake pipe of an engine of a vehicle such as an automobile.

Figure 2:
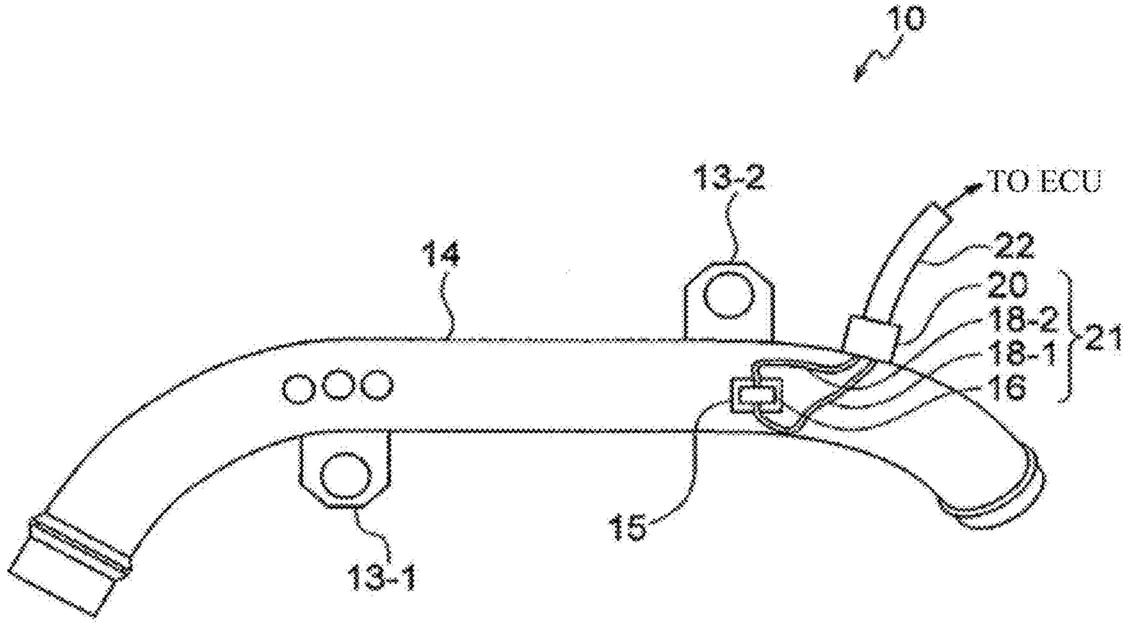
FIG. 2 is a diagram illustrating a configuration of a deterioration detection part fabricated from a resin part to be diagnosed by the method of diagnosing the resin part illustrated in FIG. 1.

FIG. 2 illustrates an example of a configuration of a deterioration detection part 10. The deterioration detection part 10 may be fabricated by a deterioration detection part fabrication process (step S31), based on an intake pipe 14. The deterioration detection part fabrication process (step S31) may be a first process of the method of diagnosing the deterioration of the resin part. FIG. 2 illustrates a schematic configuration of the deterioration detection part 10 in which a detection additional member 15 is added to a surface of the intake pipe 14, and a surface resistance measuring device 21 is attached to the periphery of the intake pipe 14. The surface resistance measuring device 21 may measure a surface resistance of the detection additional member 15. Hereinafter, an example of a procedure for fabricating the deterioration detection part 10 will be described.

Figure 3A:
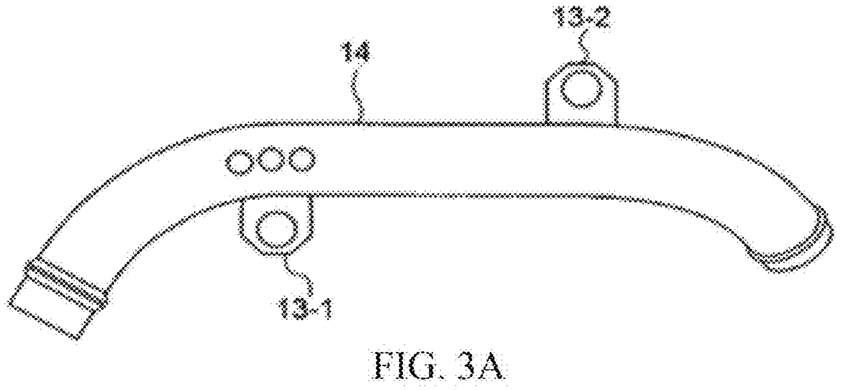
FIGS. 3A to 3C are each a diagram illustrating a fabrication procedure of the deterioration detection part illustrated in FIG. 2.
Figure 3B:
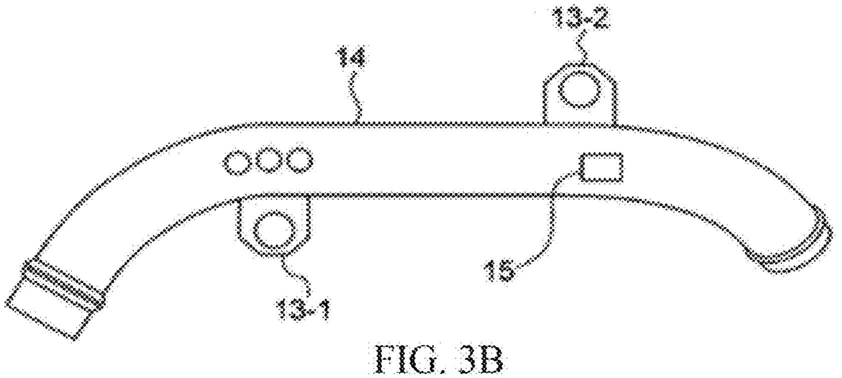
Figure 3C:
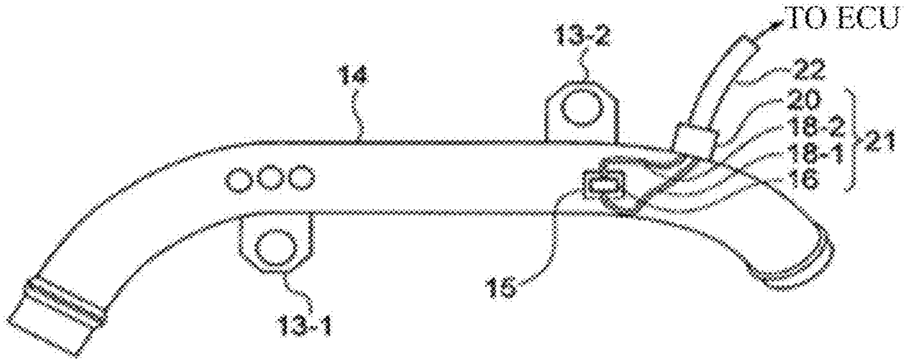

FIGS. 3A to 3C each illustrate an example of the procedure for fabricating the deterioration detection part 10. Referring to FIG. 3A, the intake pipe 14 may be fabricated by, for example, integral molding. The intake pipe 14 may include a material such as nylon or polyamide. Fixing parts 13-1 and 13-2 may be provided at predetermined locations of the intake pipe 14. The fixing parts 13-1 and 13-2 may fix the intake pipe 14 to a predetermined position of the vehicle.

Thereafter, the detection additional member 15 may be added to a surface of the intake pipe 14 as illustrated in FIG. 3B. In some embodiments, the detection additional member 15 may be added to the intake pipe 14 by bonding the detection additional member 15 to the surface of the intake pipe 14. The detection additional member 15 may be cut into a chip shape having a predetermined size. In some embodiments, the detection additional member 15 may be integrally molded or insert-molded by so inserting the detection additional member 15 as to be positioned at a predetermined surface position upon the integral molding of the intake pipe 14. In some embodiments, the detection additional member 15 may include, for example but not limited to, polycarbonate or polyester having low hygroscopicity.

Thereafter, the surface resistance measuring device 21 adapted to measure the surface resistance of the detection additional member 15 may be attached to the detection additional member 15 as illustrated in FIG. 3C. The surface resistance measuring device 21 may include a body 20 and a measuring probe 16. The measuring probe 16 may include unillustrated two needle electrodes. These needle electrodes may be so provided as to be in contact with the detection additional member 15. The body 20 and the measuring probe 16 may be coupled to each other by lead wires 18-1 and 18-2, and may be so configured that a surface resistance value is measured by a current flowing when a voltage is applied between the needle electrodes, for example. A result of the measurement may be transmitted by a harness 22 to an engine control unit (ECU). In one embodiment, the ECU may serve as a "control unit" mounted on the vehicle. The ECU may monitor a measurement value of the surface resistance.

If the detection additional member 15 is hygroscopic, the measurement of the surface resistance value can become unstable due to moisture. In the example embodiment, however, the detection additional member 15 may include a material such as polycarbonate or polyester having low hygroscopicity as described above, allowing for a stable measurement of the surface resistance value and increased reliability of the result of the measurement. For example, even if an attempt is made to directly measure, with the surface resistance measuring device 21, a surface of the intake pipe 14 that is an example of the resin part to be measured, it is difficult to stably measure the surface resistance value of the intake pipe 14 that includes a resin having high hygroscopicity such as nylon. Nylon or polyamide is a resin material frequently used in vehicles and has relatively high hygroscopicity. Improving the reliability of the result of the measurement of the surface resistance value makes the estimation of the degree of progress of the deterioration of the resin part to be diagnosed highly accurate as described below.

Thereafter, a deterioration detection part incorporation process (step S32) of the flowchart of FIG. 1 may be performed. The thus-fabricated deterioration detection part 10 may be incorporated into a portion where the intake pipe 14 that is an example of the resin part is to be incorporated. The incorporation of the deterioration detection part 10 may not differ from a regular incorporation of the intake pipe 14. For example, the deterioration detection part 10 may be attached to a predetermined location of the vehicle by using the fixing parts 13-1 and 13-2 of the intake pipe 14.

Thereafter, a deterioration degree detection process (step S33) that detects the degree of progress of the deterioration of the detection additional member 15 is performed. The degree of progress of the deterioration of the detection additional member 15 may be performed by measuring the surface resistance value of the detection additional member 15 by the surface resistance measuring device 21. In some embodiments, the measurement may be performed constantly while the control unit of the vehicle is in operation, for example, while the engine of the vehicle is running. This configuration makes it possible to, even if the intake pipe 14 that is an example of the resin part deteriorates in a shorter time than is assumed for various reasons, detect the deterioration of the intake pipe 14 without missing the same. The deterioration in a shorter time than is assumed may encompass a situation where the deterioration detection part 10 has received an excessive heat load due to an unusual use state, such as non-running of the vehicle for a long period of time while the engine is in operation state under high temperature and hot sun.

The surface resistance value of the detection additional member 15 measured by the surface resistance measuring device 21 may be monitored by the ECU.

Figure 4A:
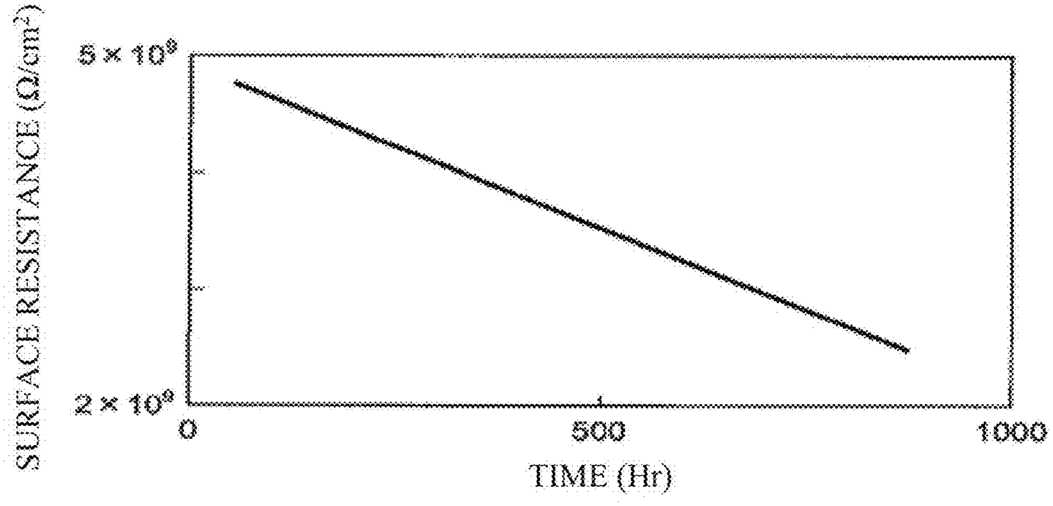
FIGS. 4A and 4B are each a diagram illustrating an example of a temporal change in a surface resistance measurement value of a detection additional member of the method of diagnosing the deterioration of the resin part illustrated in FIG. 1.
Figure 4B:
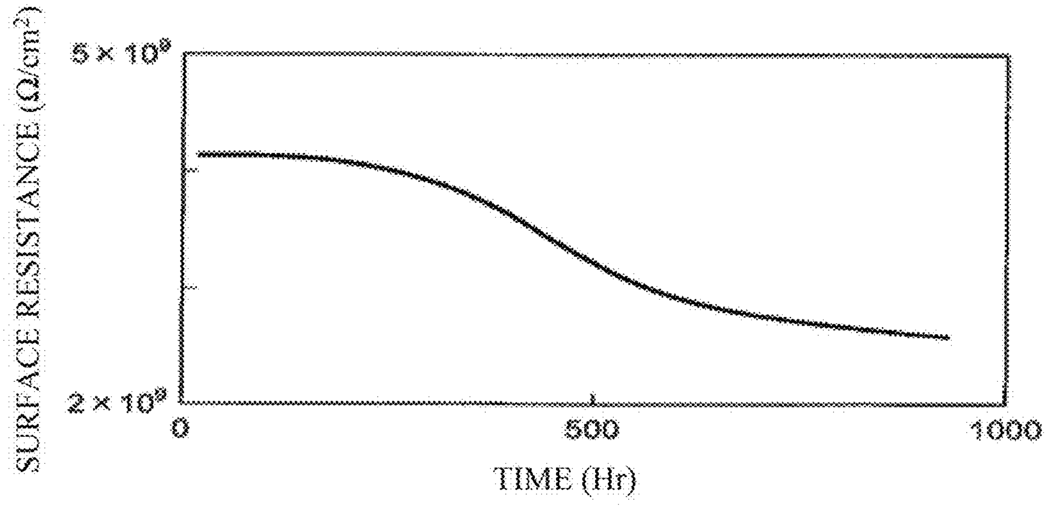

FIGS. 4A and 4B are each a diagram illustrating an example of a temporal change in a surface resistance measurement value of the detection additional member 15. In FIGS. 4A and 4B, a vertical axis represents a surface resistance ($\Omega/cm^2$) and a horizontal axis represents the time (hour). The surface resistance value can decrease in various ways. For example, the surface resistance value can decrease linearly as illustrated in FIG. 4A, or decreases nonlinearly as illustrated in FIG. 4B. What is notable is that the surface resistance value decreases over time due to a thermal degradation of a member, due to a change in a molecular structure of a surface of the detection additional member 15. For example, by measuring the surface resistance of the member by taking advantage of this phenomenon, it is possible to know the time in which a deterioration factor such as a thermal load is added to the member. Further, by performing an experiment in which a deterioration factor such as the thermal load is added to the member for a predetermined time in advance, it is possible to know the time in which the deterioration factor is added to the member and the degree of the deterioration of the member.

Thereafter, a deterioration progress degree estimation process (step S34) may be performed. The deterioration progress degree estimation process may estimate the degree of progress of the deterioration of the resin part, based on correlation data obtained in advance. The correlation data may be related to a correlation between the deterioration of the detection additional member 15 and the deterioration of the resin part. For example, the deterioration progress degree estimation process may be based on the correlation data on the deterioration between the detection additional member 15 and the intake pipe 14. It is possible to easily know the degree of deterioration of the detection additional member 15, based on the measured surface resistance value of the detection additional member 15 and from the relationship between the surface resistance value and the time as described above. Further, using the correlation data makes it possible to estimate the degree of deterioration of the intake pipe 14 that is an example of the resin part. The estimation may be automatically conducted by setting a program in a machine such as a computer and inputting the measured surface resistance value of the detection additional member 15 into the machine.

The correlation of the deterioration makes it possible to know the time corresponding to the measured surface resistance value of the detection additional member 15, e.g., the time in which the deterioration factor such as the thermal load is added, based on, for example, the predetermined relationship between the surface resistance value of the detection additional member 15 fabricated in advance and the time as described above. The deterioration factor corresponding to the thus-known time may be added to both of the detection additional member 15 and the resin part to be diagnosed. Further, an analysis such as an infrared spectroscopy analysis or a chemical luminescence analysis may be performed on each of the detection additional member 15 and the resin part to be diagnosed, and a factor such as a reaction force or a displacement when a predetermined stress is added may be measured to understand the degree of deterioration of each of the detection additional member 15 and the resin part to be diagnosed, following which the degree of deterioration of the detection additional member 15 and the degree of deterioration of the resin part to be diagnosed may be associated with each other. Conducting the above operation for any corresponding time out of the various corresponding times makes it possible to obtain the correlation data on the deterioration between the detection additional member 15 and the resin part to be diagnosed.

Thereafter, an estimation result transmission process (step S35) may be performed in which the thus-estimated result is sent to a vehicle-related organization via a mobile communication system. Non-limiting examples of the vehicle-related organization may include a manufacturer of the vehicle, a dealer of the vehicle, a repair shop of the vehicle, or a factory of the vehicle. In the example embodiment, the surface resistance value of the detection additional member 15 may be measured, for example, every hour while the engine of the vehicle is in operation. A result of the measurement of the surface resistance value of the detection additional member 15 may be transmitted from an in-vehicle control unit such as the ECU or a power control unit (PCU) to a vehicle-related organization via the mobile communication system. In one embodiment, the PCU may serve as the “control unit” mounted on the vehicle.

With this configuration, it is possible for the vehicle-related organization to more accurately measure, based on the transmitted data, a timing at which a malfunction of the resin part occurs due to the deterioration of the resin part. Accordingly, this configuration helps to allow a user to obtain a sense of security regarding a management of the durability of the vehicle.

According to the method of diagnosing the deterioration of the resin part of the example embodiment, the surface resistance value of the detection additional member 15 for which the correlation between the deterioration of the detection additional member 15 and the deterioration of the intake pipe 14 is obtained may be constantly monitored while the engine of the vehicle is in operation, and a result of the monitoring may be transmitted to the vehicle-related organization. This configuration helps to easily and clearly understand the progress of the deterioration of the intake pipe 14. This configuration also helps to prevent the occurrence of the deterioration from being overlooked, and to improve a management capability of the durability of the vehicle. Accordingly, this configuration helps to improve the user’s long-term reliability of the vehicle as well.

In some embodiments, the addition of the detection additional member 15 to the resin part in the fabrication process of the deterioration detection part 10 may be performed by attaching the detection additional member 15 to the surface of the resin part, and the deterioration degree detection process of the detection additional member 15 may be performed based on the measurement of the surface resistance value of the detection additional member 15. This configuration helps to easily fabricate the deterioration detection part 10 in a short time. In addition, measuring the surface resistance value of the detection additional member 15 suffices for the detection of the degree of deterioration of the detection additional member 15. Accordingly, this configuration helps to easily detect the degree of deterioration of the detection additional member 15 in a simple fashion.

In some embodiments, the detection additional member 15 may include polycarbonate or polyester having low hygroscopicity. This configuration helps to stably measure the surface resistance value and to improve the reliability of the measurement result. Accordingly, this configuration helps to allow an accuracy of the estimation of the degree of progress of the deterioration of the resin part to be high.

In some embodiments, the measurement of the surface resistance value may be performed by: coupling the surface resistance measuring device 21 to the detection additional member 15; constantly measuring the surface resistance value of the detection additional member 15 while the engine of the vehicle is in operation; and monitoring a result of the measurement through the in-vehicle control unit such as the ECU or the PCU. Thus, the surface resistance value of the detection additional member 15 may be constantly measured while the engine is in operation. This configuration helps to, even if the resin part deteriorates in a shorter time than is assumed for various reasons, detect the deterioration of the resin part without missing the same. Accordingly, this configuration helps to improve the reliability of the durability of the vehicle.

In some embodiments, the estimation result transmission process may be included that transmits a result of the estimation of the degree of progress of the deterioration of the resin part to the vehicle-related organization such as the manufacturer of the vehicle, the dealer of the vehicle, the repair shop of the vehicle, or the factory of the vehicle via the mobile communication system. This configuration helps to allow the vehicle-related organization such as the manufacturer of the vehicle, the dealer of the vehicle, the repair shop of the vehicle, or the factory of the vehicle to more accurately measure the timing at which a malfunction of the resin part occurs due to the deterioration of the resin part. Accordingly, this configuration helps to allow the user to obtain a sense of security regarding the management of the durability of the vehicle.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the intake pipe 14 of the engine is exemplified as the resin part, although a resin part to be diagnosed is not limited to thereto. The method of diagnosing the deterioration of the resin part according to any embodiment of the disclosure is applicable to any of various other resin parts. In addition, an example embodiment has been described in which the surface resistance measuring device 21 includes the body 20 and the measuring probe 16, although it is not limited thereto. In some embodiments, the surface resistance measuring device 21 may be a measuring device in which the body 20 and the measuring probe 16 are combined.

Further, the surface resistance value of the detection additional member 15 may be measured constantly while the engine of the vehicle is in operation in the deterioration degree detection process. In some embodiments, the surface resistance value of the detection additional member 15 may be measured at any necessary timing. In such embodiments, the estimation result transmission process may not be performed constantly as well and may be performed at a predetermined timing.

The invention claimed is:

1. A method of diagnosing a deterioration of a resin part, the method estimating a degree of progress of the deterioration of the resin part incorporated in a vehicle, the method comprising:

fabricating a deterioration detection part by adding a detection additional member to the resin part, the detection additional member being faster in progress of a deterioration than the resin part and being easier to detect the progress of the deterioration than the resin part, the adding the detection additional member to the resin part comprising bonding the detection additional member to a surface of the resin part or insert-molding the detection additional member to the resin part;

incorporating the deterioration detection part into a portion, of the vehicle, where the resin part is to be incorporated;

detecting, after an elapse of a predetermined period of time, a degree of the progress of the deterioration of the detection additional member added to the resin part; and estimating, based on correlation data obtained in advance, the degree of the progress of the deterioration of the resin part, the correlation data being data on a correlation between the deterioration of the detection additional member and the deterioration of the resin part.

2. The method of diagnosing the deterioration of the resin part according to claim 1, wherein the detecting the degree of the progress of the deterioration of the detection additional member comprises measuring a surface resistance value of the detection additional member.

3. The method of diagnosing the deterioration of the resin part according to claim 1, wherein the detection additional member comprises polycarbonate or polyester.

4. The method of diagnosing the deterioration of the resin part according to claim 2, wherein the detection additional member comprises polycarbonate or polyester.

5. The method of diagnosing the deterioration of the resin part according to claim 2, wherein the measuring the surface resistance value comprises:

coupling a surface resistance measuring device to the detection additional member;

measuring the surface resistance value of the detection additional member while a control unit mounted on the vehicle is in operation; and monitoring a result of the measuring of the surface resistance value through the control unit.

6. The method of diagnosing the deterioration of the resin part according to claim 1, further comprising transmitting, via a mobile communication system, a result of the estimating of the degree of the progress of the deterioration of the resin part to a vehicle-related organization, the vehicle-related organization being selected from the group of a manufacturer of the vehicle, a dealer of the vehicle, a repair shop of the vehicle, and a factory of the vehicle.

* * * * *